June 10, 1958 S. F. CYBULSKI 2,837,828
BUILT-UP SNAP GAUGE

Filed Jan. 31, 1955 2 Sheets-Sheet 1

INVENTOR:
STEPHEN F. CYBULSKI
BY Fisher & Christen

June 10, 1958 S. F. CYBULSKI 2,837,828
BUILT-UP SNAP GAUGE

Filed Jan. 31, 1955 2 Sheets-Sheet 2

INVENTOR:
STEPHEN F. CYBULSKI
BY Fisher & Christen

United States Patent Office 2,837,828
Patented June 10, 1958

2,837,828

BUILT-UP SNAP GAUGE

Stephen F. Cybulski, Waterbury, Conn.

Application January 31, 1955, Serial No. 485,128

12 Claims. (Cl. 33—168)

The present invention relates to a convertible built-up snap gauge. The primary object of this invention is to provide a gauge of high flexibility which may be supplied to machine shops for use in a wide range of sizes.

It is well known in the prior art to space a pair of gauging elements, sometimes called anvils, by means of a spacer block. It is also known to provide spacer blocks of different thicknesses so that a single gauge may be used for multiple operations. One difficulty with such prior art constructions has been that the anvils and spacer block are customarily joined by means of a screw or bolt extending through one or both of the anvils and the spacer bar. The hole provides a point of weakness and limits endwise movement of the block between the gauge elements, thus further limiting the utility of such gauges.

It has now been found that these and other difficulties can be avoided by provision of a pair of solid anvils spaced by a solid spacer bar assembled and clamped together by means of a clamp lying wholly outside the confines of the anvils and the spacer bar. In the preferred form of the invention, two clamps of identical construction are provided, one at each end of the built-up gauge. Each clamp comprises a pair of bridge members, one pressing each anvil in the direction of the other, a pair of side blocks, one at each side of the assembly, and four screws, each extending diametrically through one end of one bridge member and axially into one end of one side block. The bridge members are round to provide a narrow contact line, thereby avoiding distorting effects; and one of the round bridges of each clamp may be rotatable to assure that clamp pressure will be exerted properly. It will be seen that this preferred construction provides a clamp which eliminates the possibility of tilting or twisting the gauge elements and causes them to lie flat against all points along the spacer block. By keeping the effective jaws of the clamps spaced a distance shorter than the spacer block, any tendency of the clamping force to bow or otherwise distort the gauge elements is avoided. It is, of course, possible to use other clamping means, such as a vise or an ordinary wood clamp, but the combination of bridges, side blocks and screws provides a distinct improvement in accuracy and practicability over these other constructions.

The spacer blocks of this invention are usually rectangular members made from hardened steel, and two opposite faces are ground to provide an absolute thickness. These opposing faces are parallel and uniform along the length of the block.

The anvils may take many different forms without departing from the scope of this invention. In the preferred form, they are square with two ground faces of absolute dimensions, and one end of one anvil is provided with a "tolerance" step to form the "go" end of the gauge. The step is, of course, on one of the ground faces, and the depth of the step predetermines the permissible tolerance in the item to be gauged. Likewise, the anvils are provided with conventional broken corners at the opposite end to indicate the "no go" end of the gauge.

In other embodiments of the invention, the gauge anvils may be provided with one, two, three or more steps for varying tolerances. Other anvils may be provided with round extensions having a predetermined relation to the spacer bar for gauging either inside or outside dimensions, and other variations will be obvious to those skilled in the art.

The invention will be better understood by reference to the accompanying drawings, in which.

Figure 1:
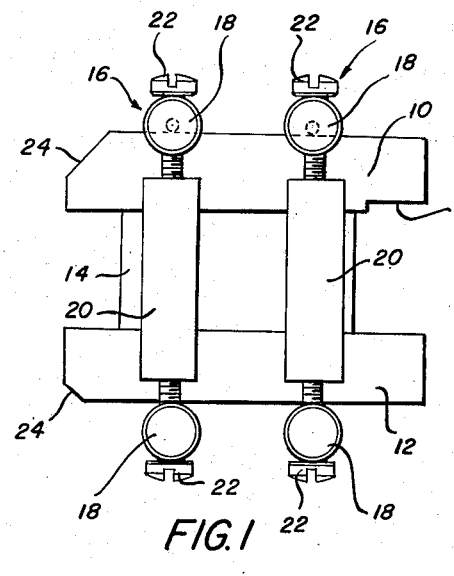
Fig. 1 is a side elevational view of the preferred form of the invention.

In the preferred form of the invention shown in Fig. 1, a pair of gauge anvils are shown at 10 and 12, and a spacer block is illustrated at 14. These three members form a built-up snap gauge assembly, which is held in properly assembled position by a pair of clamps indicated generally at 16. Each clamp is made up of a pair of bridges 18, a pair of side bars 20 and four screws 22.

In this form of the invention, anvils 10 and 12 are provided with conventional "no-go" indicating broken corners 24; and anvil 10 is provided at its "go" end with a tolerance step 25.

Each of the anvils 10 and 12 are made of hardened square steel bars, and the upper and lower surfaces are precision ground to form parallel planar surfaces. It is not necessary to have the sides machined to the same degree of accuracy, but straight sides permit a better fit in the clamp and permit use of any two sides as gauging elements.

The spacer bar is a replaceable, rectangular member having a width about equal to the width of the anvils and a thickness corresponding to a dimension to be gauged. It is made from hardened steel, and its upper and lower surfaces are precision ground to the desired dimensions. It may be replaced from time to time, depending on the nature of the item to be gauged. The length of the spacer bar is always less than the length of the anvils and is preferably from about ½ to ⅔ of the length of the anvil in order to assure complete accuracy.

The two clamps 16 are spaced apart a substantial distance, and each is constructed with a view towards easily bringing it into a position absolutely perpendicular to the anvils. In the form illustrated in the drawings, bridge members 18 are cylindrical to give line contact, thereby making them easily adjusted because of their tendency to find the shortest distance between two points. This aids in preventing any loosening as might be encountered should the clamps be tightened in any position other than perpendicular to the anvils. It will also be noted that each upper bridge 18 (Figs. 1, 2) is provided with an annular guide groove 26 to straddle the anvils and guide the bridges.

The side bars 20 may be any suitable construction, and in some forms of the invention can be eliminated by providing a single screw extending all the way through one bridge into another at the opposite side of the assembly. In the form shown, the screws 22 extend diametrically through the ends of the bridges and axially into mating female screw-threaded holes in the ends of the side bars.

In one form of the invention (illustrated in Fig. 8), the bridge indicated generally at 126 comprises an axle 118 and is provided with holes for screws 122 at each end thereof and a roller 150 mounted on the axle between the ends thereof so that on tightening of the clamp, the roller increases the ease with which the clamp is moved into a position perpendicular to the anvils.

Figure 8:
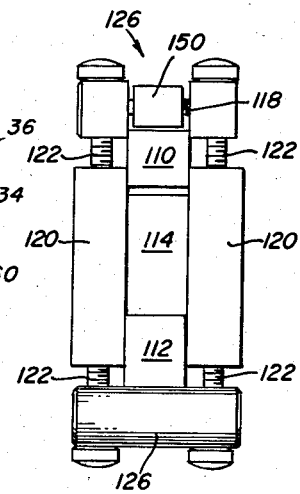
Fig. 8 is an end elevational view illustrating a modified form of the invention in which one bridge member includes a roller bearing on an anvil.

In the modified form of the invention illustrated in Fig. 8, there is a spacer block 114, an anvil 110, an anvil 112 and a pair of side bars 120 corresponding to the elements found in the other forms of the invention.

Figure 2:
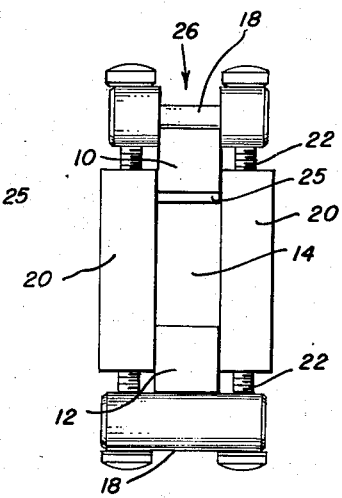
Fig. 2 is an end elevational view of the right end of the device shown in Fig. 1.
Figure 4:
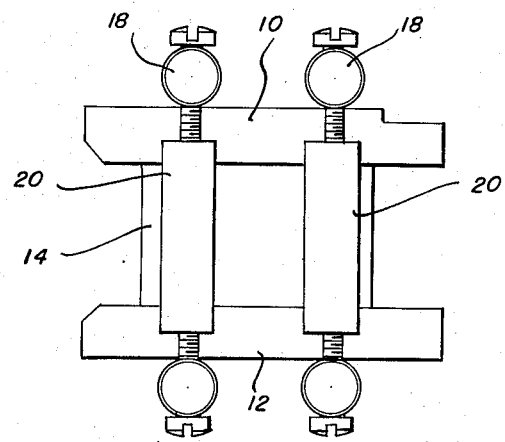
Fig. 4 is a side elevational view of that form of the invention shown in Fig. 1 in which the gauging anvils have been reversed for gauging inside dimensions.

In the preferred form of the invention shown in Figs. 1 and 2, the apparatus is adapted to gauge the outside dimension of any mechanical element. It is a simple "go," "no-go" snap gauge. If the same device is desired to be used for gauging inside dimensions, screws 22 may be loosened, bars 10 and 12 may be inverted and screws 22 re-tightened. The resulting device is illustrated in Fig. 4. If it is desired to convert the device shown in Figs. 1 and 2 into a device in which the "go" and "no-go" gauge elements are both on the same end of the gauge, this can be very simply done by moving the spacer bar all the way to the left in Fig. 1. A device to be gauged may then be inserted at the right of Fig. 1, and, if it is properly dimensioned, it should go as far back as the end of step 25, but not beyond. The same form of the invention may be further modified by shifting anvil 10 to the left to where the shoulder of step 25 aligns with the right edge of spacer bar 14, and by shifting anvil 12 about the same distance to the right. When assembled in this position, the gauge provides a shelf outside the gauging jaws for both the "go" and "no-go." The shelf can be lengthened by either shortening the spacer bar or by lengthening the anvils.

The thickness of the spacer bar need not be exactly the same thickness as the desired thickness of the element to be gauged. It need only correspond in a known relation. This is illustrated by those forms of the invention shown in Figs. 3, 5, 6 and 7. It will be noted that the only difference in the clamp shown in those forms of the invention from the form illustrated in Figs. 1, 2 and 4 is that upper bridges 18 have no groove 26.

Figure 3:
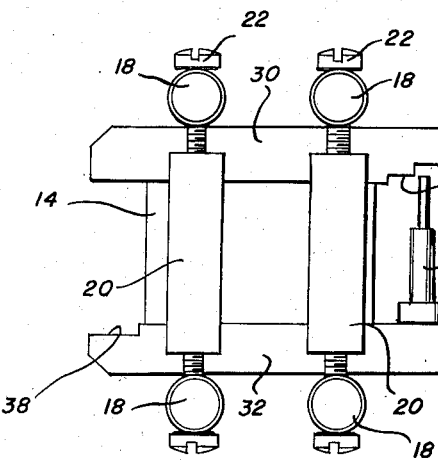
Fig. 3 is a side elevational view illustrating another form of the invention in which the gauge elements have been slightly modified.

In Fig. 3, the anvil 30 is provided with a step 34 to form a "no-go" jaw and a step 36 to form a "go" jaw for gauging an element 60. The other anvil 32, has one straight end which cooperates with steps 34 and 36, but its other end is provided with a step 38, which forms a "no-go" jaw with the straight extension of anvil 30.

Figure 5:
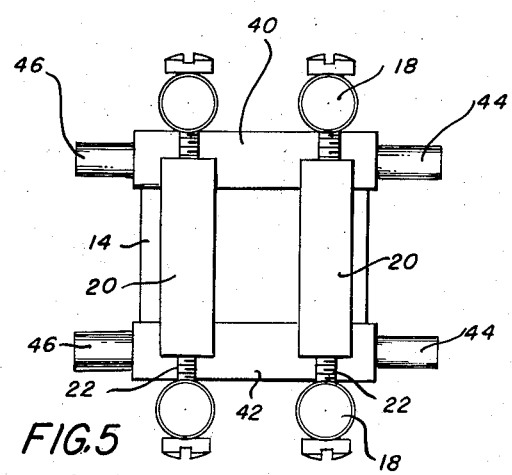
Fig. 5 is a further modification according to the present invention in which the anvils are provided with cylindrical extensions for gauging either inside or outside dimensions.

In that embodiment of the invention illustrated in Fig. 5, each anvil 40 and 42 is provided with a "go" projection 44 for gauging inside dimensions, and, likewise, each anvil is provided with a "no-go" projection 46 for the same purpose.

Figure 6:
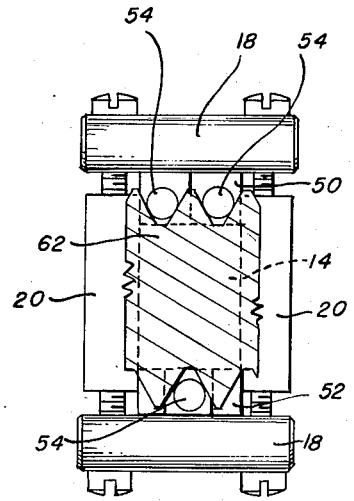
Fig. 6 is an end elevational view of a further modification of the invention in which one anvil is provided with two extensions and another anvil is provided with one extension for gauging screw-threaded elements.
Figure 7:
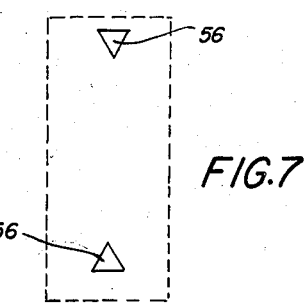
Fig. 7 is a diagrammatic representation of a gauge in which the anvils are provided with extensions shaped in the form of triangles.

In Fig. 6, the anvils 50 and 52 are provided with projections 54 adapted to gauge a screw-threaded element 62 (shown in section); and in the modification shown in Fig. 7, projections 56 are illustrated as being triangular for providing point contact.

Other modifications will be readily apparent to those skilled in the art.

Thus it will be seen that the present invention provides a built-up snap gauge made of two anvils which themselves are replaceable and which are spaced by a replaceable spacer bar of predetermined dimensions, corresponding to dimensions to be gauged. The gist of the invention is the clamping means, which lie entirely outside the confines of the anvils and the spacer bars, thereby permitting maximum flexibility and utility of the gauge.

As has been explained above, the clamping means may take any one of several forms. A form not shown which has also been found useful for purposes of this invention is quite similar to the forms illustrated in the drawings, except that the heads of the screws are recessed into the bridge members, and the bridge members are square instead of round. Other variations will of course be obvious to those skilled in the art.

I claim:

1. A build-up snap gauge comprising a pair of elongated anvils each having a gauging element, a spacer block positioned between said anvils, said block having a predetermined thickness corresponding to a dimension to be gauged, means to hold said anvils against said block including at least one bridge member bearing on each anvil for forcing it in the direction of the other, and screw means positioned laterally outside the space occupied by said anvils and blocks for drawing said bridge members together, said screw means being positioned at each side of the anvils and said block.

2. A device as set forth in claim 1, wherein each of said anvils has a gauge-ground planar face on the side adjacent the spacer block, and the spacer block has gauge-ground parallel planar faces on the two opposite sides adjacent the anvils.

3. A device as set forth in claim 2 wherein one of said anvils is provided with a step portion for making a "go" "no-go" gauge.

4. A device as set forth in claim 2 wherein said anvils terminate in projections extending along the length thereof for measuring inside dimensions.

5. A device as set forth in claim 2 wherein projections from each end of said anvil are adapted to gauge screw-threaded members.

6. The device as set forth in claim 1 wherein said means to hold said anvils against said spacer block include a pair of side blocks, one positioned on each side of the anvils and spacer block, and said screw means include screws extending through each end of each bridge member and into one end of one of said side blocks.

7. A device as set forth in claim 2, wherein said anvils and spacer block are rectangular, and each of the anvils and spacer blocks are made from hardened steel with only two faces at opposite sides ground to absolute dimensions.

8. A device as set forth in claim 7 wherein a ground tolerance step is provided in one of the anvil faces provided with absolute dimensions.

9. A device as set forth in claim 7 wherein said anvils are square in lateral cross section.

10. A device as set forth in claim 7, wherein said anvils include projections and dimensions different from the thickness of the spacer bar.

11. A built-up snap gauge comprising a pair of elongated square anvils each having a gauging element and one straight face positioned facing the other and extending along the length thereof, a shorter elongated spacer block of predetermined thickness corresponding to a dimension to be gauged positioned between said anvils, a pair of clamps to hold said anvils against said block, said clamps being spaced apart a distance no greater than the length of said spacer block, and each of said clamps including a pair of bridge members extending across said anvils, one forcing each anvil towards the other, a pair of side blocks, one positioned on each side of the anvils and spacer block, and four screws, each extending diametrically through one end of one bridge member and axially into one end of one of said side blocks, one of said bridge members being provided with a roller bearing against one of said anvils, whereby said clamp automatically assumes the proper position on being tightened.

12. A built-up snap gauge comprising a pair of anvils of rectangular cross-section spaced by a bar of rectangular cross-section, bridge means for each of said anvils and adjustable means lying laterally outside the confines of said anvils and block and connecting said bridge means for each of said anvils, said adjustable means cooperating with said bridge means to hold the anvils against the block.

References Cited in the file of this patent

UNITED STATES PATENTS

| | | |
|---|---|---|
| 1,491,098 | Hoke | Apr. 22, 1924 |
| 2,254,894 | Johansson | Sept. 2, 1941 |
| 2,409,817 | Webber | Oct. 22, 1946 |
| 2,663,948 | Scully | Dec. 29, 1953 |

FOREIGN PATENTS

| | | |
|---|---|---|
| 362,915 | Germany | Nov. 3, 1922 |
| 462,109 | Germany | July 4, 1928 |
| 859,810 | Germany | Dec. 15, 1952 |

OTHER REFERENCES

Publication, "Gage Blocks and Accessories" Catalog No. 17, June 1, 1945, page 10 (Copy in Div. 66.), Ford Motor Co., Johansson Div., Dearborn, Mich.

Publication, "American Machinist," Jan. 30, 1947, page 111, article, "Built-Up Snap Gages" by R. Kaden. (Copy in Library.)